United States Patent
Bergano (10) Patent No.: US 6,744,992 B2
(45) Date of Patent: Jun. 1, 2004

(54) SYNCHRONOUS AMPLITUDE MODULATION FOR IMPROVED PERFORMANCE OF OPTICAL TRANSMISSION SYSTEMS

(75) Inventor: Neal S. Bergano, Lincroft, NJ (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 0 days.

(21) Appl. No.: 10/315,560

(22) Filed: Dec. 10, 2002

(65) Prior Publication Data

US 2003/0118350 A1 Jun. 26, 2003

Related U.S. Application Data (63) Continuation of application No. 09/776,942, filed on Jan. 17, 2001, which is a continuation of application No. 08/771,097, filed on Dec. 20, 1996, now abandoned.

(51) Int. Cl.$^7$ .............................................. H04B 10/04
(52) U.S. Cl. ...................... 398/183; 398/152; 398/184; 398/185; 398/186; 398/188
(58) Field of Search .......................... 398/65, 141, 152, 398/154, 183–186, 188

(56) References Cited

U.S. PATENT DOCUMENTS

| | | | |
|---|---|---|---|
| 5,373,382 A | 12/1994 | Pirio et al. ................... 359/161 |
| 5,473,458 A | 12/1995 | Mamyshev et al. ......... 359/161 |
| 5,477,375 A | * 12/1995 | Korotky et al. ............. 359/264 |
| 5,526,162 A | 6/1996 | Bergano ...................... 359/181 |
| 5,946,119 A | 8/1999 | Bergano et al. ............. 359/124 |
| 6,407,842 B1 | * 6/2002 | Ma ............................. 398/152 |
| 6,556,326 B2 | * 4/2003 | Bergano ...................... 398/183 |

OTHER PUBLICATIONS

Bergano et al; "100Gb/s WDM Transmission of Twenty 5 Gb/s NRZ Data Channels Over Transoceanic Distances Using a Gain Flattened Amplifier Chain"; European Conference on Optical Communication (ECOC'95), Paper Th. A.3.1., Brussels, Belgium, Sep. 17–21, 1995.

Bergano and Davidson; IEEE Journal of Lightwave Technology, vol. 14, No. 6, p. 1299; Jun. 1996.

Bergano et al; IEEE Phot. Tech. Lett., vol. 5, No. 3; Mar. 1993.

* cited by examiner

Primary Examiner—Kinfe-Michael Negash (57) ABSTRACT

A method and apparatus is provided that yields improved performance of both single channel and WDM long-distance optical transmission systems by synchronously modulating of the transmitted signal's amplitude. An amplitude modulator receives an optical signal onto which data has been modulated at a predetermined frequency. The modulator re-modulates the amplitude of the optical signal in a continues fashion with a waveform that is periodic, whose fundamental frequency is equal to the same predetermined frequency at which the data is modulated onto the optical signal. The resulting signal (which is neither a pure NRZ or RZ signal) is more tolerant to the distortions usually found in lightwave transmission systems, thus giving superior transmission performance.

20 Claims, 6 Drawing Sheets

SYNCHRONOUS AMPLITUDE MODULATION FOR IMPROVED PERFORMANCE OF OPTICAL TRANSMISSION SYSTEMS

CROSS REFERENCE TO RELATED APPLICATIONS

This application is a continuation of U.S. application Ser. No. 09/776,942, filed Jan. 17, 2001, which is a continuation of U.S. application Ser. No. 08/771,097, filed Dec. 20, 1996, now abandoned.

FIELD OF THE INVENTION

The invention relates to the optical transmission of information and more particularly, to a method and apparatus for improving transmission capabilities over optical fiber transmission systems.

BACKGROUND OF THE INVENTION

Very long optical fiber transmission paths, such as those employed in undersea or transcontinental terrestrial lightwave transmission systems, which employ optical amplifier repeaters, are subject to decreased performance due to a host of impairments that accumulate along the length of the optical fiber comprising the transmission path. The source of these impairments within a single data channel include amplified spontaneous emission (ASE) noise generated in the Erbium-Doped Fiber-Amplifiers (EDFAs), nonlinear effects caused by dependence of the single-mode fiber's index on the intensity of the light propagating through it, and chromatic dispersion which causes different optical frequencies to travel at different group velocities. In addition, for wavelength division multiplexed (WDM) systems, where several optical channels might be on the same fiber, crosstalk between channels caused by the fiber's nonlinear index must be considered. Typically, it is advantageous to operate long-haul transmission systems at high data rates per channel. For example, multiples of the Synchronous Digital Hierarchy (SDH) standard of 2.5 Gb/s are generally considered useful. Generally speaking, the impairments that limit the system's performance cause two types of degradations in the received eye pattern, which are related to randomness (caused by noise) and deterministic degradations (or distortions in the received bit pattern). Distortions of the second type are sometimes referred to as Inter-Symbol Interference (ISI). As the bit rates rise into the gigabit per second range it becomes critical to manage those impairments that effect the shape of the received pulses, and to limit the ISI.

Distortions of the received waveform are influenced by the shape of the transmitted pulses and the details of the design of the transmission line. Two signaling formats considered useful in long-haul transmission systems are the non-return-to-zero (NRZ) and solitons formats. The transmission format used in most long-haul lightwave system is the NRZ format because it is easy to generate, detect and process. The name NRZ is applied to this format because it describes the waveform's constant value characteristic when consecutive binary ones are sent. Alternatively, a string of binary data with optical pulses that do not occupy the entire bit period are described generically as Return-to-Zero or RZ. The two most common examples of RZ signaling pulses are a rectangular pulse that occupies one half of the bit period, and a hyperbolic secant pulse (or soliton) with a pulse width of about ⅕ of the time slot.

Known methods of reducing noise and distortion in lightwave transmission systems include the application of synchronous polarization and phase modulation to the NRZ signaling format (see U.S. Pat. No. 5,526,162), dispersion management of the transmission line, or the use of optical solitons. Scrambling the state-of-polarization of the optical carrier at the bit-rate of the transmitted NRZ signal can greatly improve the transmission performance of long-haul optical amplified transmission systems. In addition to synchronous polarization scrambling, superimposed phase modulation (PM) can dramatically increase the eye opening of the received data pattern. This increase results from the conversion of PM into bit-synchronous amplitude modulation (AM) through chromatic dispersion and nonlinear effects in the fiber. These synchronous polarization/phase modulations techniques were used in a WDM transmission system having a total transmission capacity of 100 Gb/s (20 WDM channels at 5 Gb/s) over 6300 km, as discussed in Bergano, et al., "100 Gb/s WDM Transmission of Twenty 5 Gb/s NRZ Data Channels Over Transoceanic Distances Using a Gain Flattened Amplifier Chain," European Conference on Optical Communication (ECOC'95), Paper Th.A.3.1, Brussels, Belgium, Sep. 17–21, 1995.

While these methods have been effective, it is desirable to further reduce distortion to improve the performance of long distance optical transmission systems.

SUMMARY OF THE INVENTION

In accordance with the present invention, a method and apparatus is provided that yields improved performance of both single channel and WDM long-distance optical transmission systems by synchronously modulating of the transmitted signal's amplitude. An amplitude modulator receives an optical signal onto which data has been modulated at a predetermined frequency. The modulator re-modulates the amplitude of the optical signal in a continues fashion with a waveform that is periodic, whose fundamental frequency is equal to the same predetermined frequency at which the data is modulated onto the optical signal. The resulting signal (which is neither a pure NRZ or RZ signal) is more tolerant to the distortions usually found in lightwave transmission systems, thus giving superior transmission performance.

In accordance with one aspect of the invention, an optical transmission system is provided that includes a transmitter, an optical transmission path coupled to the transmitter, and a receiver coupled to the optical transmission path. The transmitter includes an optical signal source for generating an optical signal onto which data is modulated at a predetermined frequency. An amplitude modulator is coupled to the optical signal source for modulating the intensity of the data modulated signal. A clock, which is coupled to the amplitude modulator, has a frequency that determines the frequency of the amplitude modulator. The frequency of the clock is phase locked and equal to the predetermined frequency at which data is modulated.

DETAILED DESCRIPTION

Figure 1:
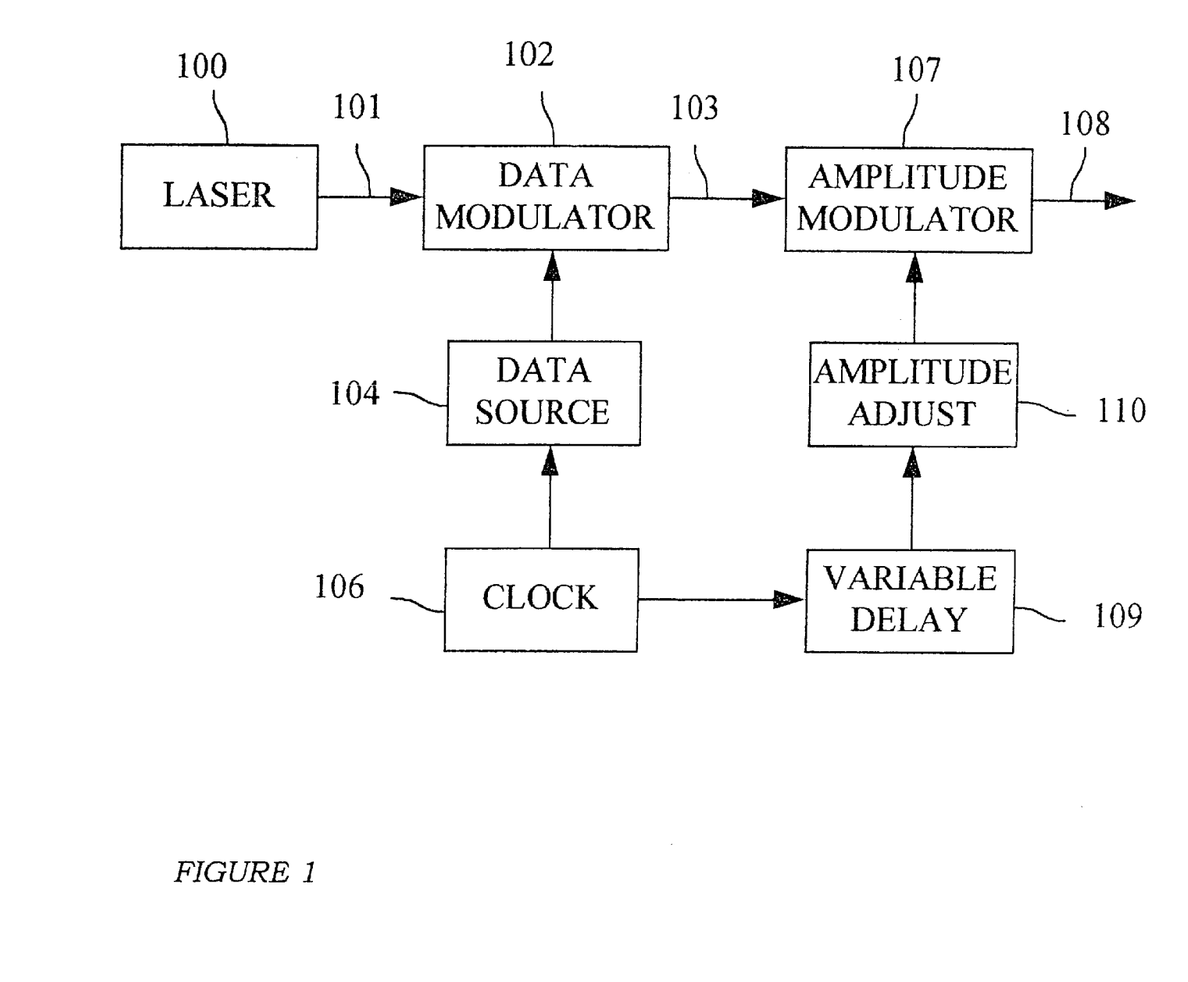
FIG. 1 shows a simplified block diagram of one embodiment of the synchronous amplitude modulated transmitter in accordance with the present invention.

FIG. 1 shows a simplified block diagram of an exemplary optical transmitter facilitating the practice of the invention. As shown, the invention includes a laser 100 for producing a continuous wave (CW) optical signal 101. The optical signal 101 is transmitted to a data modulator 102 that modulates the signal to impart information thereto in a well known fashion, producing a modulated optical information signal 103. The data modulator 102 receives the data to be imparted to the optical signal 101 from a data source 104 and modulates the optical signal 101 at a frequency determined by a clock 106. The optical information signal 103 is transmitted from the data modulator 102 to an amplitude modulator 107 which places additional intensity modulation on the optical information signal 103. Modulators 102 and 107 could be, for example, a 10 Gb/s modulator manufactured by Lucent Technologies as model number 2023.

In accordance with the present invention, the amplitude modulator 107 is driven by the clock 106 so that the intensity of the optical information signal 103 is re-modulated at a rate equal to the rate at which data is imparted to the optical signal 101, which is defined by clock 106. As further shown in FIG. 1, it may be advantageous to provide an electrical variable-delay 109 and an amplitude adjustment mechanism 110 which couple the clock 106 to the amplitude modulator 107. The variable delay 109 may be employed to selectively adjust the phase of the amplitude modulation imparted by amplitude modulator 107 relative to the phase of the data modulation imparted by data modulator 102. The amplitude adjustment mechanism 110 is employed to adjust the modulation depth that amplitude modulator 107 imparts to optical information signal 103. The optimal settings for these adjustments will depend on many parameters and can be determined empirically. Moreover, in a WDM system, the optimal setting for each channel would not necessarily be the same and thus the channels may be individually optimized.

The manner in which the clock 106 drives the amplitude modulator 107 may be described by examining the electric field components of the optical signal 103 on which the amplitude modulator acts. In x-y coordinates these components may be expressed as follows:

$$E_x(t) = A_x(t) e^{i(\omega t + \phi_x(t))} \quad (1)$$

$$E_y(t) = A_y(t) e^{i(\omega t + \phi_y(t))} \quad (2)$$

where $\omega$ is the optical carrier frequency, $A_x(t)$ and $A_y(t)$ are assumed to be real field amplitudes which include the intensity modulation imposed by data modulator 102, and $\phi_x(t)$ and $\phi_y(t)$ are the optical phase components and include any optical phase modulation that might be present. The amplitude modulator 107 serves to modulate the optical signal by varying only the real amplitudes $A_x(t)$ and $A_y(t)$, with a function F(t) that is periodic and has a fundamental frequency component that is equal to, and phase locked to, the clock signal generated by clock 106. Amplitude modulator 107 impresses an additional amplitude modulation such that the intensity of optical information signal 103 is multiplied by I(t). For purposes of illustration it is assumed that the periodic function F(t) is normalized to be in the range bounded by [+1,−1]. I(t) is given by;

$$I(t) = 0.5 * [(1-B) F(t + \Psi_{am}) + 1 + B] \quad (3)$$

$$B \equiv \frac{100 - A_{am}}{100 + A_{am}} \quad 0 \le A_{am} \le 100 \quad (4)$$

where $A_{am}$ is the percentage of amplitude modulation placed on optical information signal 103 by modulator 107, and $\Psi_{am}$ is the phase angle of the modulation with respect to the data modulation. Thus, I(t) is simply a scaled version of the periodic function F(t) with a maximum value of unity, a minimum value of B, and is offset in time by $\Psi_{am}$. It is anticipated that the level of the amplitude modulation is adjusted by amplitude adjustment mechanism 110, and the offset $\Psi_{am}$ is adjusted by variable delay 109. The signal 108 from the transmitter is then represented by the following electric field components:

$$E_{x\text{-}out}(t) = \sqrt{I(t)} A_x(t) e^{i(\omega t + \phi_x(t))} \quad (5)$$

$$E_{y\text{-}out}(t) = \sqrt{I(t)} A_y(t) e^{i(\omega t + \phi_y(t))} \quad (6)$$

Equations (5) and (6) have been written in general terms for any periodic function that fits the above description. However, it may be advantageous to employ sinusoidal modulation, which will be the basis for the illustrative waveforms shown in FIG. 2 and FIG. 3.

Figure 2:
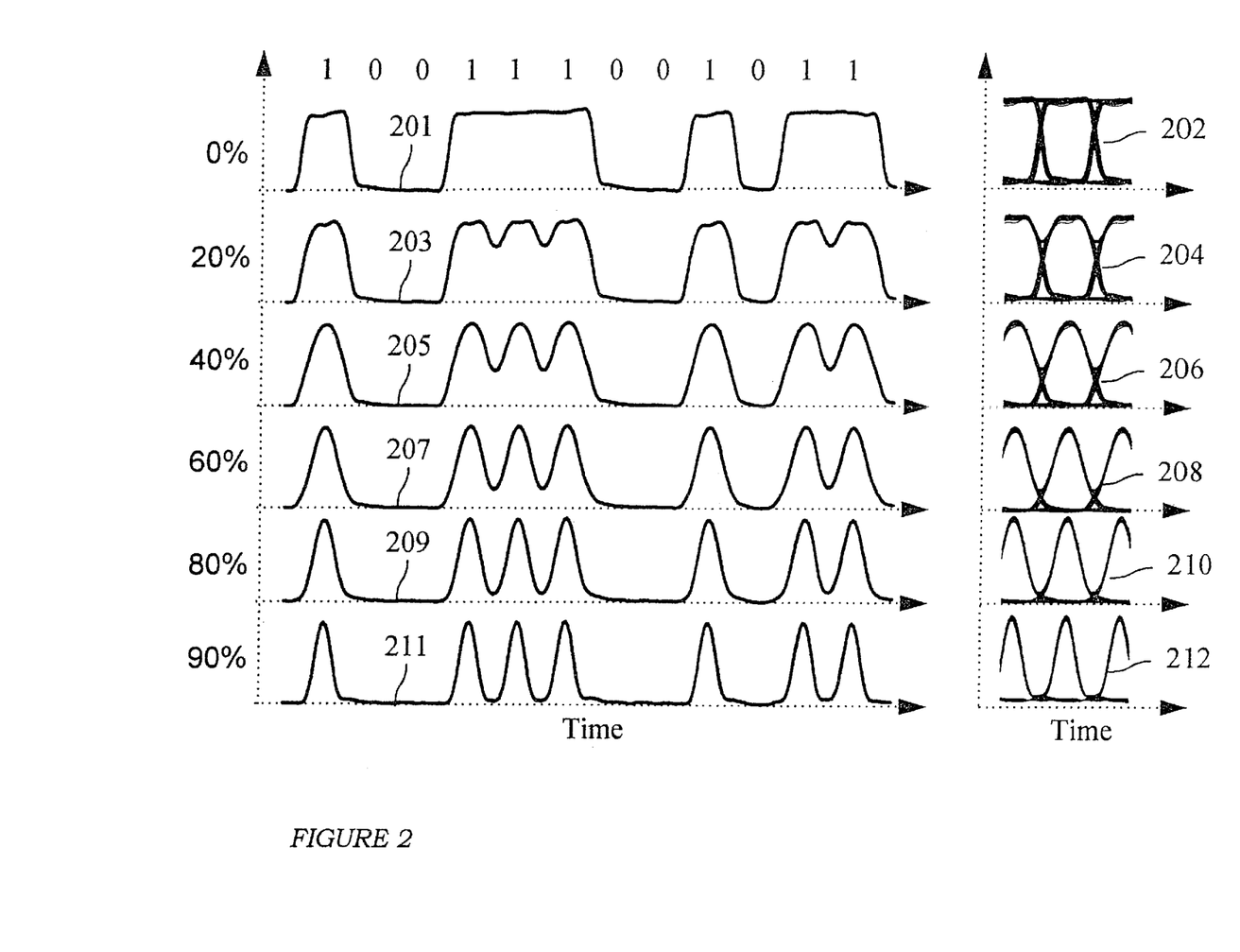
FIG. 2 shows typical waveforms and their corresponding eye diagrams produced by the transmitter shown in FIG. 1

FIG. 2 shows a series of typical waveforms representing output signal 108 when the periodic waveform providing the additional amplitude modulation is a sinusoidal function. Each waveform, which comprises twelve bits, results from a different level of modulation depth imparted by the amplitude modulator 107. Adjacent each waveform is its corresponding eye diagram. Waveform 201 and its corresponding eye diagram 202 are typical examples of a conventional NRZ waveform. Waveforms 203, 205, 207, 209, and 211, which respectively correspond to eye diagrams 204, 206, 208, 210, and 212, show waveforms for amplitude modulation levels of 20%, 40%, 60%, 80%, and 90%, respectively.

The waveforms generated by the present invention do not conveniently fit the definition of any conventional modulation format. For example, the waveforms shown in FIG. 2 are not constant in value over contiguous "1" bits and thus do not fit the standard definition of the NRZ format. In addition, since the waveforms do not necessarily return to zero between adjacent bits, they do not fit the standard definition of the RZ format. This waveform generated by the present invention provides a tradeoff between two regimes in the transmission system. The energy in the pulses is more concentrated near the center of the bit slot, which is desirable for limiting the amount of ISI, but since the bit almost fills the bit slot, the peak intensity is not as large as it would be, for example, in a soliton system. In addition, the rise and fall times of the pulses are reduced, which has the potential benefit of lowering the amount of chirp induced on the pulse by the fiber's nonlinear index.

One of ordinary skill in the art will recognize that the waveforms shown in FIG. 2 may be produced by variants of the transmitter shown in FIG. 1. For example, the modulation imparted in FIG. 1 by the amplitude modulator could be alternatively generated by electrical means prior to impressing the optical carrier signal 101 with data. For example, the data source 104 could supply to the modulator 102 electrical waveforms similar to those in shown in FIG. 2 so that the amplitude modulation is directly imparted onto the carrier signal 101. Alternatively, such an electrical waveform could be used to directly modulate a semiconductor laser, such as a distributed feedback laser. Also it is appreciated that the periodic waveform used to drive the additional modulation stage 107 in FIG. 1 need not be a sinusoid.

Figure 3:
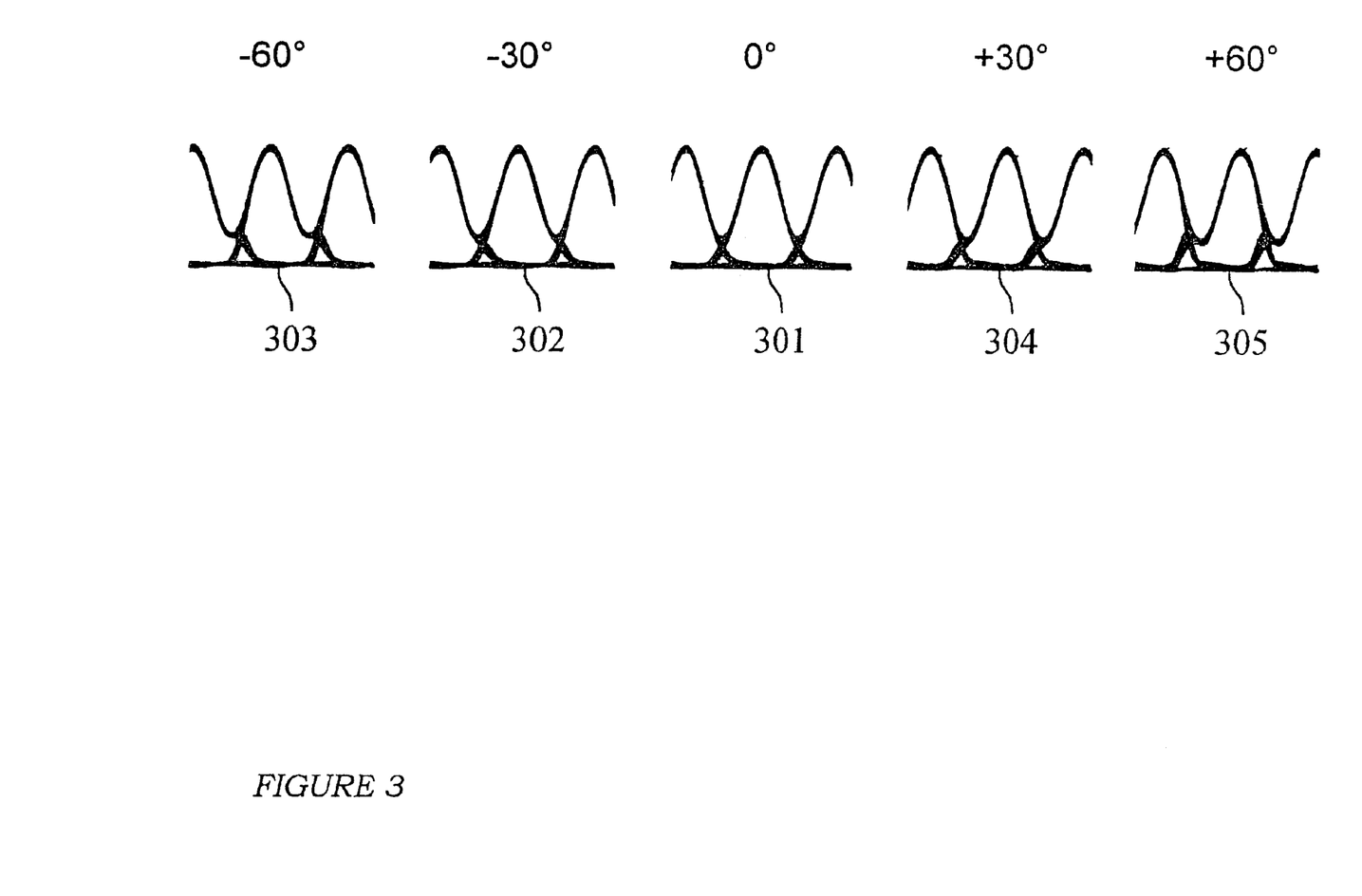
FIG. 3 shows typical eye diagrams produced by the transmitter in FIG. 1 for differing periods of delay between the data modulation and the synchronous amplitude modulation.

FIG. 3 illustrates the effects of the delay element 109 on the eye diagram by showing five eye diagrams of the output signal 108 for different phase offsets. The eye diagrams in this figure were all produced using a sinusoidal amplitude modulation level of 60%, similar to eye diagram 208 in FIG. 2. In eye diagram 301 the phase of the amplitude modulation is aligned with the phase of the impressed data. Eye diagrams 302 and 303 were produced by shifting the phase of the amplitude modulation by −30° and −60°, respectively, with respect to the impressed data. Similarly, eye diagrams 304 and 305 were produced by shifting the phase of the amplitude modulation by +30° and +60°, respectively, with respect to the impressed data. A known amount of skew can be conveniently built into the transmitted eye by shifting the modulation phase in this manner. This feature could be used to correct for certain impairments found in high-speed lightwave communications. For example in systems using 10 Gb/s carriers, it is known that the single-mode fiber's third order dispersion can cause a skew in the received eye. By placing a known amount of skew in the transmitted eye it may be possible to offset some of the penalty associated with the impairment caused by the known waveform distortions.

Figure 4:
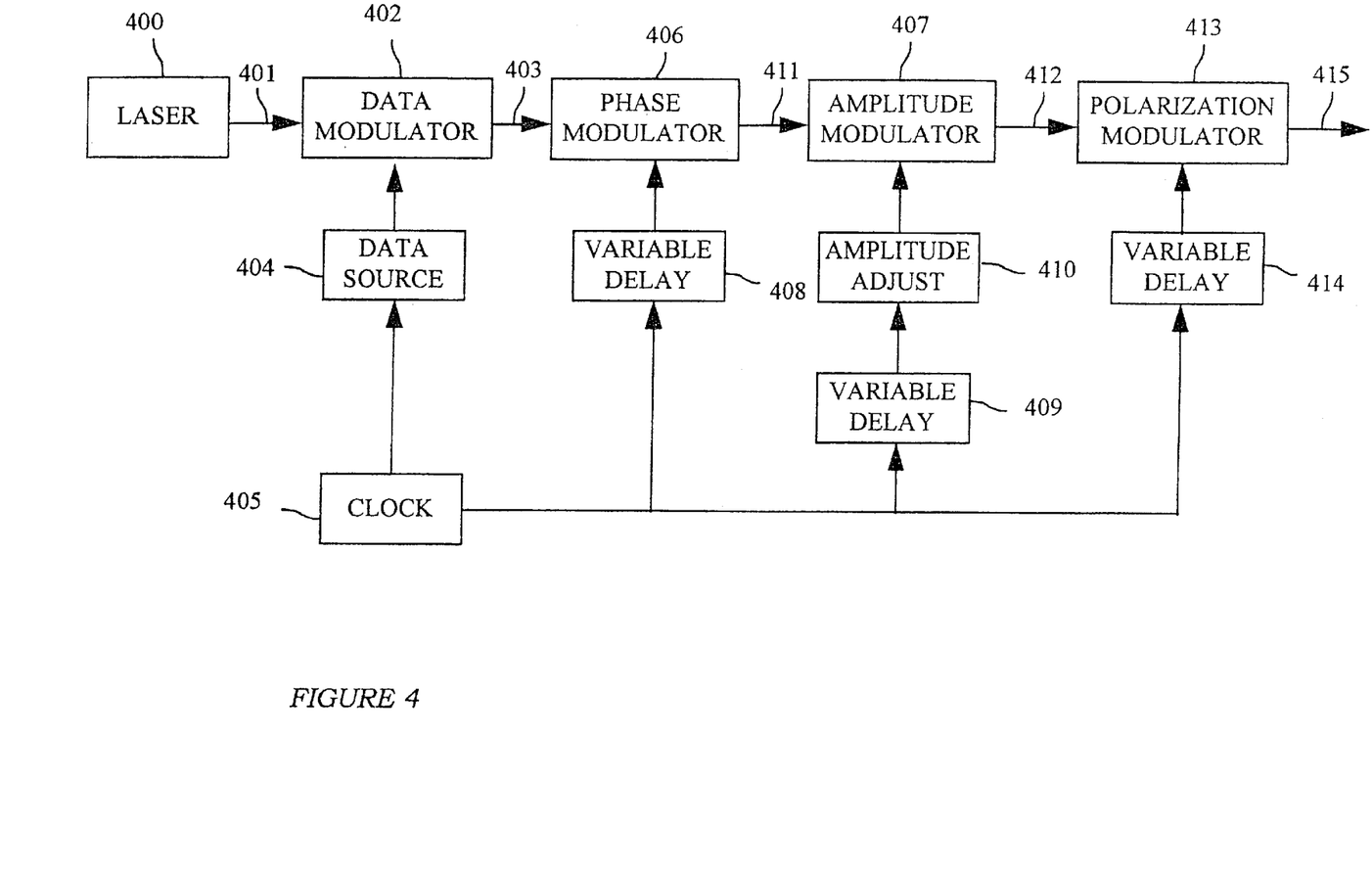
FIG. 4 shows a simplified block diagram of an alternative embodiment of the transmitter that includes synchronous optical phase modulation, amplitude modulation, and polarization modulation.

FIG. 4 shows an alternative embodiment of the invention in which the additional amplitude modulator 107 is used in connection with a transmitter employing synchronous polarization and optical phase modulation. An example of such a transmitter is disclosed in U.S. Pat. No 5,526,162 to Bergano. In FIG. 4, a laser 400 produces a continuous wave (CW) optical signal 401. The optical signal 401 is transmitted to a data modulator 402 that modulates the signal to impart information thereto in a well known fashion, producing a modulated optical information signal 403. The data modulator 402 receives the data to be imparted to the optical signal 401 from a data source 404 and modulates the optical signal 401 at a frequency determined by a clock 405. The optical information signal 403 is transmitted from the data modulator 402 to optical phase modulator 406, amplitude modulator 407, and finally to polarization modulator 413. The clock 405 drives the three modulation stages via a series of variable delay elements 408, 409, and 414, which are used to selectively adjust the delay of the modulation imparted by modulators 406, 407, and 413 relative to the phase of the data modulation imparted by modulator 402. In accordance with the present invention, the amplitude modulator 407 is driven by the clock 405 so that the intensity of the optical information signal is re-modulated at a rate equal to the rate at which data is imparted to the optical signal 401. Similar to the FIG. 1 embodiment, an amplitude adjustment mechanism 410 is employed to set the modulation depth that amplitude modulator 410 imparts on signal 413.

The manner in which the clock 405 drives phase modulator 406, amplitude modulator 407, and polarization modulator 413 may be described by examining the electric field components of the optical signal 415. These components are similar to those presented in equations (5) and (6) with the inclusion of additional phase terms. For example, assume that the synchronous modulation imparted by the modulators is sinusoidal. The transmitter shown in FIG. 4 modifies the optical phase of the signal produced by the transmitter of FIG. 1 while the amplitude is unchanged. In this case the phase modulation imparted to the optical signal includes two separate and independent phases: a phase $\Psi_2$ associated with polarization modulator 413 and a phase $\Psi_1$ associated with the optical phase modulator 406. Thus, the phase angles $\phi_x$ and $\phi_y$ of the optical signal 415 launched from the polarization modulator become:

$$\phi_x(t)=a_x \cos(\Omega t+\Psi_2)+b \cos(\Omega t+\Psi_1) \quad (7)$$

$$\phi_y(t)=a_y \cos(\Omega t+\Psi_2)+b \cos(\Omega t+\Psi_1) \quad (8)$$

where $a_x$ and $a_y$ are the phase modulation indices of the polarization modulator, b is the phase modulation index of the optical phase modulator, $\Psi_{1,2}$ are the phase offsets set by delay elements 408 and 414, respectively, and $\Omega$ is the bitrate determined by clock 405.

As equations (7) and (8) indicate, the optical phase modulator 406 imparts the same phase modulation to both the x and y components of the optical signal. Accordingly, the optical phase modulator 406 modulates the optical phase of signal 403 without modulating its polarization. The reason the optical phase modulator 406 does not modulate the polarization is because the polarization modulation of the optical signal is proportional to the difference between the phases $\phi_x$ and $\phi_y$ and this difference is unaffected by the optical phase modulator 406 since it modulates both $\phi_x$ and $\phi_y$ by equal amounts. In principle, every possible State-of-Polarization (SOP) of a monochromatic signal having these electric field components can be obtained by varying the ratio $a_x/a_y$ while maintaining the value of $(a_x^2+a_y^2)$ constant and varying the relative phase difference $\phi_x-\phi_y$ between 0 and $2\pi$. However, the polarization modulator 413 serves to modulate the SOP of the optical signal by varying only the difference of the phases $\phi_x$ and $\phi_y$, which is sufficient to provide a SOP whose average value over a modulation cycle is low. Polarization modulator 413 alters the SOP of the optical information signal in such a way that the degree of polarization over the modulation period is reduced from unity. Accordingly, the output signal 415 has a degree of polarization that can be substantially equal to zero and is said to be polarization scrambled. The polarization modulator 413 may serve to trace the SOP of optical information signal 415 on a complete great circle of the Poincarésphere. Alternatively, the SOP of the optical signal may reciprocate along the Poincarésphere. In either case, the average value of the SOP over each modulation cycle is substantially lowered from its normal value of unity.

One of ordinary skill in the art will recognize that the functions of the various modulators are shown in FIG. 4 for purposes of illustration only and that two or more of the modulators may be realized in a single functional unit. For example, as previously mentioned, data modulator 402 may also function as the amplitude modulator 407 by having the data source 404 provide the proper electrical drive signal. In addition, the functions of phase modulator 406 and polarization modulator 413 may be combined in a manner similar to that shown in FIG. 3 of U.S. Pat. No. 5,526,162.

Figure 5:
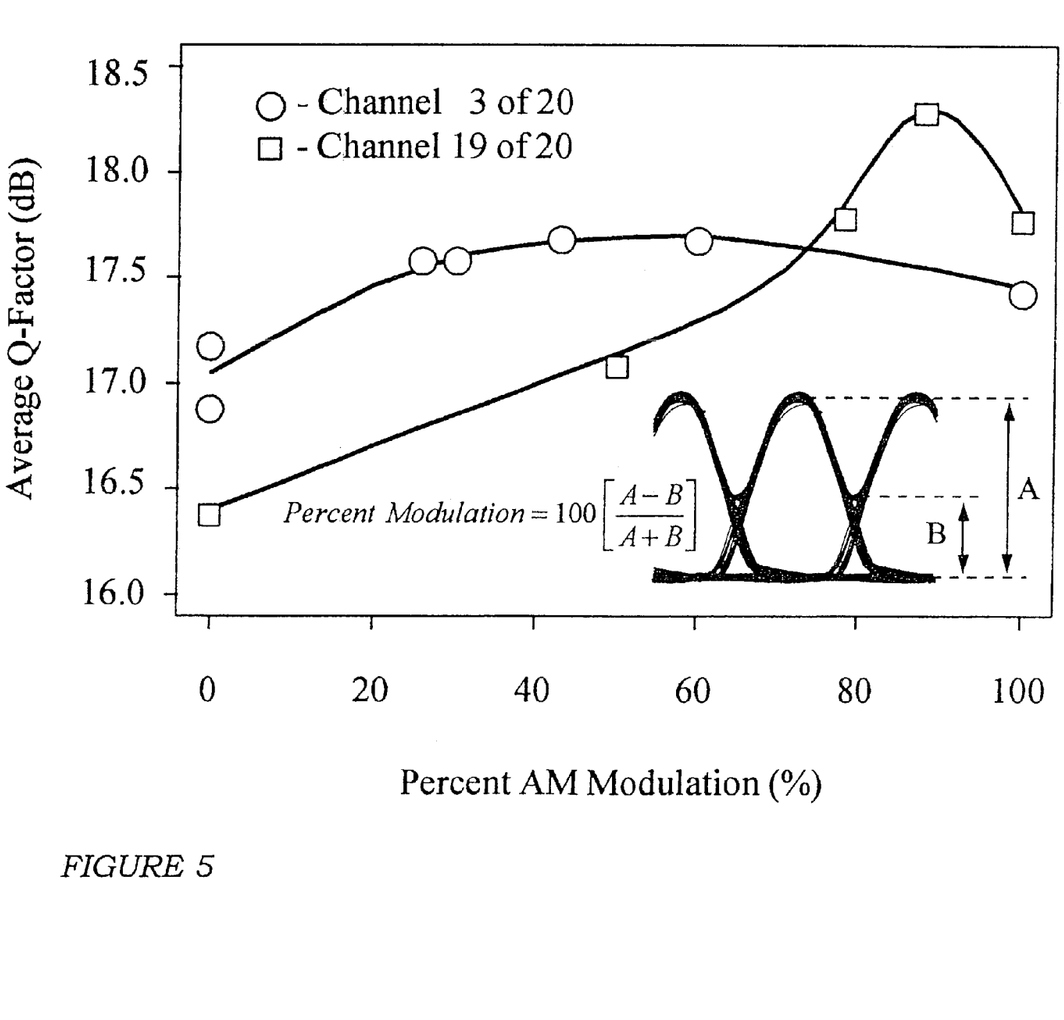
FIG. 5 shows the resulting Q-factor verses the level of synchronous amplitude modulation for an arrangement similar to that shown in FIG. 4.

The experimental results presented in FIG. 5 were obtained from a transmitter of the type shown in FIG. 4, which incorporated an NRZ transmitter having synchronous amplitude, phase, and polarization modulation. The transmission path, which used circulating loop techniques, extended 9,300 kms and employed twenty WDM channels, each operating at a bit rate of 5.0 Gbits/sec with an average launch power of +7 dBm for all of the channels. The experiment was similar to the results for a twenty channel system presented by Bergano and Davidson in IEEE Journal of Lightwave Technology, Vol. 14, No. 6, p. 1299 June 1996, except that in the present arrangement the EDFAs were pumped at 980 nm, which improved the noise figure and increased the transmission distance. FIG. 5 shows the resulting Q-factor (i.e., the electrical signal-to-noise ratio) versus the depth of modulation for channels 3 and 19. The two channels are representative of two different chromatic dispersion regimes of the system. Channel 3, located at 6.8 nm below the zero dispersion wavelength $\lambda_o$, had an average dispersion of −0.51 ps/km-nm and channel 19, located 2.8 nm above the zero dispersion wavelength $\lambda_o$, had an average dispersion of +0.21 ps/km-nm. The data indicates that good Q-factor performance can be achieved by selecting an appropriate value for the depth of modulation. The appropriate value differs from both the pure NRZ format (0% depth of modulation) and the RZ format (greater than 100% depth of modulation). FIG. 5 also provides a definition used to calculate the depth of modulation.

Figure 6:
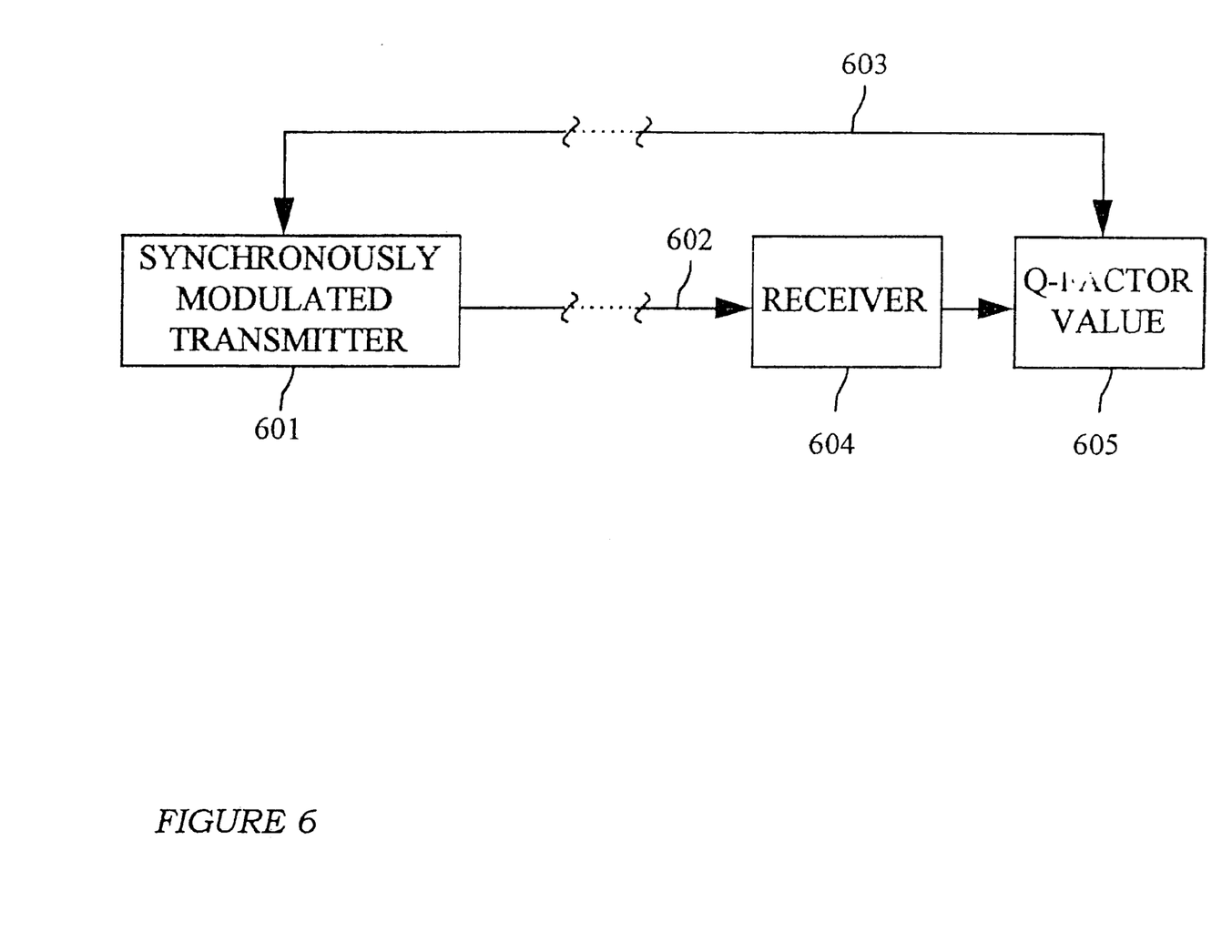
FIG. 6 shows an embodiment of a transmission system architecture in accordance with the present invention.

FIG. 6 is an example of a transmission system including a transmitter, receiver, transmission path, and telemetry path in accordance with the present invention. Shown are a synchronously modulated transmitter 601 such as shown in FIG. 1 or 4, transmission medium 602, and telemetry path 603 which connects equipment at the receiver side to the transmitter side to feedback a characteristic of the received signal such as the Q-factor. Transmission medium 602, for purposes of this example, but not as a limitation on the invention, is a chain of optical amplifiers and single-mode optical fibers. These elements are well known in the art. Transmitter 601 produces an optical information signal whose amplitude, and/or optical phase and polarization is synchronously modulated as described above. At the receiver, the Q-factor is measured as an indication of transmission performance with a Q-factor measurement apparatus 605. The Q-factor, which provides a method for determining the transmission performance of signals after propagation through lightwave systems, is discussed in Bergano et al., IEEE Phot. Tech. Lett., Vol. 5, No. 3, March 1993. Apparatus 605 could be, for example, a Q measurement unit manufactured by Advantest under the model number D3281. The Q-factor is sent back to the transmitter 601 via telemetry path 603. It will be appreciated by those skilled in the art that it may be desirable, in some applications, for telemetry path 603 to be part of the same transmission system, such as overhead bits in a SDH frame, or an order-wire channel, or be transmitted on a different channel, such as a separate phone line. The Q-factor is received and processed by a logic element that may be located, for example, within the synchronously modulated transmitter 601. The logic element controls the level and the relative timing of the various modulation stages imparted to the signal 60 to maximize the received Q-factor. This type of feedback system could assist in maintaining adequate transmission performance in the presence of a fading channel, which can be caused by polarization effects.

What is claimed is:

1. An apparatus for transmitting an optical signal comprising:

an optical signal source for generating an optical signal onto which data is modulated at a predetermined frequency, said optical signal having an associated predetermined pulse width;

a data modulator coupled to said optical signal source, said data modulator configured to modulate said optical signal;

an amplitude modulator coupled to the optical signal source for modulating the intensity of said data modulated signal; and a clock coupled to said amplitude modulator and said data modulator, said clock having a frequency that determines the modulation frequency of the amplitude modulator, said frequency of the clock being phase locked and equal to said predetermined frequency.

2. An apparatus according to claim 1 wherein said amplitude modulator is configured to vary said predetermined pulse width.

3. The apparatus of claim 1 wherein the optical signal source comprises a continuous-wave optical signal generator and a data source, said clock being coupled to the data source for establishing the predetermined frequency at which data is modulated onto the optical signal.

4. The apparatus of claim 1 wherein the amplitude modulator modulates the amplitude of the data modulated optical signal at said predetermined frequency with a prescribed phase, and further comprising an electrical variable-delay line coupling said clock to said amplitude modulator for selectively varying the prescribed phase.

5. The apparatus of claim 4 wherein said electrical variable-delay line is a phase shifter.

6. The apparatus of claim 1 wherein said amplitude modulator includes means for selectively adjusting the degree of amplitude modulation that is imparted to said data modulated signal.

7. The apparatus of claim 1 further comprising a polarization modulator coupled to said amplitude modulator and said clock for modulating the state of polarization of said data modulated signal at said predetermined frequency such that an average value of the state of polarization over a modulation cycle is substantially equal to zero.

8. The apparatus of claim 7 wherein said polarization modulator modulates the state of polarization by tracing the polarization of said optical signal along at least a portion of a Poincaré sphere.

9. The apparatus of claim 7 wherein the polarization modulator modulates the state of polarization of the optical signal at said predetermined frequency with a prescribed phase, and further comprising an electrical variable-delay line coupling said clock to said polarization modulator for selectively varying the prescribed phase.

10. The apparatus of claim 9 wherein said electrical variable-delay line is a phase shifter.

11. The apparatus of claim 1 further comprising an optical phase modulator coupling the optical signal source to the amplitude modulator, said optical phase modulator providing optical phase modulation tosaid data modulated signal while imparting substantially no polarization modulation thereto.

12. The apparatus of claim 11 wherein said clock is coupled to said optical phase modulator so that said optical phase modulator provides optical phase modulation at a frequency that is phase locked and equal to said predetermined frequency.

13. The apparatus of claim 12 further comprising an electrical variable-delay line coupling said clock to said optical phase modulator for selectively varying the phase of said optical phase modulation provided by the optical phase modulator.

14. An apparatus for transmitting an optical signal comprising:

an amplitude modulator configured for receiving an optical signal onto which data has been modulated at a predetermined frequency, said optical signal having an associated predetermined pulse width; and a clock coupled to said amplitude modulator, said clock having a frequency that determines the modulation frequency of the modulation cycle, said frequency of the clock phase locked and equal to said predetermined frequency.

15. A method for transmitting an optical signal comprising:
   generating an optical signal onto which data is modulated by a data modulator at a predetermined frequency;
   modulating the amplitude of said data modulated signal at a frequency phase locked and equal to said predetermined frequency; and
   varying a pulse width of said data modulated signal.

16. A transmission system comprising:
   a transmitter, including
      an optical signal source for generating an optical signal,
      a data modulator coupled to said optical signal source for modulating data at a predetermined frequency to provide a data modulated signal having a predetermined pulse width;
      an amplitude modulator coupled to the optical signal source for modulating the intensity of said data modulated signal, and
      a clock coupled to the amplitude modulator having a frequency that determines the frequency of the amplitude modulator, said frequency of the clock being phase locked and equal to said predetermined frequency;
   an optical transmission path coupled to said transmitter; and
   a receiver coupled to the optical transmission path.

17. A transmission system comprising:
   a transmitter, including
      an optical signal source for generating an optical signal,
      a data modulator coupled to said optical signal source for modulating data at a predetermined frequency to provide a data modulated signal having a varying pulse width;
      an amplitude modulator coupled to the optical signal source for modulating the intensity of said data modulated signal, and
      a clock coupled to the amplitude modulator having a frequency that determines the frequency of the amplitude modulator, said frequency of the clock being phase locked and equal to said predetermined frequency;
   an optical transmission path coupled to said transmitter; and
   a receiver coupled to the optical transmission path.

18. A transmission system comprising:
   a transmitter, including
      an optical signal source for generating an optical signal,
      a data modulator coupled to said optical signal source for modulating data at a predetermined frequency;
      an amplitude modulator coupled to the optical signal source for modulating the intensity of said data modulated signal,
      a clock coupled to the amplitude modulator having a frequency that determines the frequency of the amplitude modulator, said frequency of the clock being phase locked and equal to said predetermined frequency, and
      a polarization modulator coupled to said amplitude modulator and said clock for modulating the state of polarization of the optical signal at said predetermined frequency such that an average value of the state of polarization over a modulation cycle is substantially equal to zero;
   an optical transmission path coupled to said transmitter; and
   a receiver coupled to the optical transmission path.

19. A transmission system comprising:
   a transmitter, including
      an optical signal source for generating an optical signal,
      a data modulator coupled to said optical signal source for modulating data at a predetermined frequency;
      an amplitude modulator coupled to the optical signal source for modulating the intensity of said data modulated signal,
      an optical phase modulator coupling the optical signal source to the amplitude modulator, said optical phase modulator providing optical phase modulation to said data modulated signal while imparting substantially no polarization modulation thereto, and
      a clock coupled to the amplitude modulator having a frequency that determines the frequency of the amplitude modulator, said frequency of the clock being phase locked and equal to said predetermined frequency;
   an optical transmission path coupled to said transmitter; and
   a receiver coupled to the optical transmission path.

20. A transmission system comprising:
   a transmitter, including
      an optical signal source for generating an optical signal,
      a data modulator coupled to said optical signal source for modulating data at a predetermined frequency;
      an amplitude modulator coupled to the optical signal source for modulating the intensity of said data modulated signal,
      an optical phase modulator coupling the optical signal source to the amplitude modulator, said optical phase modulator providing optical phase modulation to said data modulated signal while imparting substantially no polarization modulation thereto, and
      a clock coupled to the amplitude modulator and the optical phase modulator, said clock having a frequency that determines the frequency of the amplitude modulator and the frequency of said optical phase modulation, said frequency of the clock and said frequency of said optical phase modulation being phase locked and equal to said predetermined frequency;
      a phase shifter coupling said clock to said optical phase modulator for selectively varying the phase of said optical phase modulation,
   an optical transmission path coupled to said transmitter;
   a receiver coupled to the optical transmission path;
   means for measuring a Q-factor of an optical signal received at said receiver;
   means for transmitting said Q-factor to said transmitter; and
   means for selectively varying the phase of the amplitude modulation imparted to said data modulated signal to optimize said Q-factor.

* * * * *